(12) United States Patent
Laskowsky et al.

(10) Patent No.: US 6,812,827 B2
(45) Date of Patent: Nov. 2, 2004

(54) SYSTEM AND METHOD FOR TESTING AND MAINTAINING A PREDETERMINED PHYSICAL BIT RATE ON A LINE CONNECTION

(75) Inventors: Rolf Laskowsky, Munich (DE); Franz Schmoeller, Germering (DE)

(73) Assignee: Siemens Aktiengesellschaft, Munich (DE)

( * ) Notice: Subject to any disclaimer, the term of this patent is extended or adjusted under 35 U.S.C. 154(b) by 59 days.

(21) Appl. No.: 10/337,406

(22) Filed: Jan. 7, 2003

(65) Prior Publication Data

US 2003/0231743 A1 Dec. 18, 2003

(30) Foreign Application Priority Data

Jan. 8, 2002 (EP) .............................. 02000473

(51) Int. Cl.⁷ .............................................. H04M 11/04
(52) U.S. Cl. .................. 340/310.06; 340/511; 340/514; 340/515; 340/526; 714/699; 714/703; 714/704
(58) Field of Search .......................... 340/310.06, 506, 340/511, 514, 515, 516, 526, 533, 538, 310.01, 310.02; 714/699, 703, 704

(56) References Cited

U.S. PATENT DOCUMENTS

| | | | | |
|---|---|---|---|---|
| 5,023,872 A | * | 6/1991 | Annamalai | 714/704 |
| 6,084,917 A | | 7/2000 | Kao et al. | |
| 6,181,711 B1 | * | 1/2001 | Zhang et al. | 370/468 |
| 6,370,144 B1 | * | 4/2002 | Chao et al. | 370/395.42 |
| 6,526,531 B1 | * | 2/2003 | Wang | 714/704 |
| 6,625,255 B1 | * | 9/2003 | Green et al. | 379/1.04 |

FOREIGN PATENT DOCUMENTS

| | | |
|---|---|---|
| DE | 100 01 150 | 7/2001 |
| EP | 1 069 721 | 1/2001 |
| WO | WO 99/49610 | 9/1999 |

\* cited by examiner

*Primary Examiner*—Daryl C. Pope
(74) *Attorney, Agent, or Firm*—Morrison & Foerster LLP

(57) ABSTRACT

A system and method for testing and maintaining a predetermined bit rate on a line connection between a transmission assembly and at least one terminal, where initiation of a drop below the predetermined bit rate triggers at least one corrective measure for increasing the bit rate.

13 Claims, 3 Drawing Sheets

SYSTEM AND METHOD FOR TESTING AND MAINTAINING A PREDETERMINED PHYSICAL BIT RATE ON A LINE CONNECTION

CLAIM FOR PRIORITY

This application claims priority to Application No. 02000473.5 which was filed in the German language on Jan. 8, 2002.

TECHNICAL FIELD OF THE INVENTION

The invention relates to a method and to an arrangement for testing the bit rate on a bidirectional connection between a transmission assembly and at least one subscriber line.

BACKGROUND OF THE INVENTION

As the significance of the Internet increases, both at professional and private level, the need for Internet access facilities is rising almost exponentially. At the same time, the number of Internet contents and applications, e.g. voice, music, moving picture sequences and video conferences, is increasing, which require higher transmission rates than can be provided by analog modems or ISDN connections. While the expansion of the central connections of the Internet to form high-speed networks progresses rapidly, Internet users with no access via a dedicated line are assigned to slow connections with a gross data rate of 128 kbit/s maximum (ISDN with two B-channels).

Much faster transmission is handled using transmissions by means of digital subscriber line (DSL), which allow digital signals to be transmitted at high speed on conventional copper lines, that is to say on telephone lines too. The introduction of DSL technology provides advantages for telephone companies. For example, the two-core copper cables required are available almost everywhere, which means that most households can be equipped with broadband DSL access without great investment. In this case, the bandwidth can be varied within wide limits, in order to serve the different demands of private and business customers. Data traffic and telephony are possible at the same time, and, compared to other technologies using a high data rate, only slight electromagnetic radiation is emitted to the environment.

There are now a large number of different DSL technologies, the best known including asymmetric digital subscriber line (ADSL), very high data rate digital subscriber line (VDSL), high data rate digital subscriber line (HDSL) and single line digital subscriber line (SDSL).

Particularly ADSL is having a high level of market penetration ascribed to it in the future. ADSL systems implement asymmetric, bidirectional transmissions at their bit rates. ADSL systems thus satisfy the requirements of many broadband services and are intended to distribute them very economically to the customer's place of residence in the local exchange area.

ADSL is a novel modem technology allowing high-speed transmissions over existing two-core cables. ADSL technology allows transmission rates of more than 6 Mbit/s in the direction of the subscriber and of a maximum of 640 kbit/s in the opposite direction. The connection comprises three information channels: a high-speed channel in the direction of the subscriber, a duplex channel of average speed and a conventional telephone channel. Hence, the asymmetric transmission method is used because a typical Internet application involves more data being received than are sent, in principle. This asymmetry is permitted by virtue of the sending of data having a narrower frequency band available than is available for receiving data.

Another known variation of DSL technologies covers the single line digital subscriber line (SDSL). SDSL also requires a single two-wire pair for transmission; in addition, conventional telephone traffic is permitted at the same time. SDSL is designed for applications using symmetrical transmission rates and is thus the counterpart of ADSL.

One problem is that unwanted signal coupling arises as the line length increases and frequency rises. If symmetrical signals are transmitted in a large number of wire pairs in a cable, the bit rate which is possible is greatly limited.

This is extremely disadvantageous because the limiting of the bit rate is often not foreseeable, which results in a large number of problems, particularly synchronization problems, in the data transmission.

SUMMARY OF THE INVENTION

The invention discloses a method which can be used simply and inexpensively in a DSL data network in order to test and maintain and to stipulate the bit rate, and also an arrangement which is suitable for carrying out this method.

In one embodiment of the invention, there is a method including:
a) a physical bit rate is set and is stored in a bit rate threshold-value memory,
b) at least one corrective measure is set in order to increase the bit rate,
c) the current bit rate between a line card in the transmission assembly and the terminal is detected, triggered by a trigger signal,
d) the detected bit rate is compared with the physical bit rate stored in the bit rate threshold-value memory on the line card by a comparator device, and an alarm message is generated by an alarm device if the detected bit rate is below the physical bit rate,
e) the alarm message is transmitted to an external control system, and
f) the at least one preset corrective measure is triggered by a correction device in response to the alarm message from the external control system.

One advantage of the invention is that it provides automatic cost-saving monitoring of the current bit rate on the bidirectional connection between the transmission assembly and the subscriber line, so that a drop in the bit rate on the connection can be identified in good time, even before there is any subscriber complaint, and corrective measures can be initiated.

In one aspect of the invention, the maximum physical bit rate which can be attained is detected by evaluating the bit error rate for various system configurations which arise with at least one corrective measure in contrast to an initial configuration. This maximum bit error rate is set for operation of the connection. The physical bit rate is thus detected on the basis of the bit error rate.

In one preferred embodiment, the physical bit rate, that is the maximum possible bit rate on the bidirectional connection, is detected by the following:
a) a bit error rate threshold value is set and is stored in a bit error rate threshold-value memory,
b) a maximum physical bit rate on the bidirectional connection is set and is stored as a current physical bit rate in a bit rate threshold-value memory on a line card,
c) a test signal is transmitted between the transmission assembly and the terminal at the current physical bit rate, d) the bit error rate of the transmitted test signal is detected using a bit error rate measuring device,
e) the detected bit error rate is compared with the bit error rate threshold value by a comparator device which is connected to the bit error rate measuring device and to the bit error rate threshold-value memory, and a termination message is generated if the detected bit error rate is below the bit error rate threshold value, and the method continues with step g), or an error message is generated if the bit error rate threshold value is exceeded, and
f) the current physical bit rate is reduced and is stored as a physical bit rate in the bit error rate threshold-value memory in response to the error message, and the method continues with step c),
g) the current physical bit rate is stored in the bit rate threshold-value memory in response to the termination message.

The physical bit rate, that is the maximum bit rate at which data can be transmitted over the connection, can thus be negotiated (worked out) quickly and easily on an iterative basis. In this case, a test signal is first transmitted at a theoretically maximum possible bit rate. This maximum possible bit rate thus indicates the absolute top limit of the flow of information that can be transmitted without error in principle. This channel capacity C can be determined on the basis of the signal-to-noise ratio $S/N_0$ and the bandwidth B in line with Shannon's definition:

$$C=B*1d(1+S/(2BN_0)) \quad [bit/s]$$

The channel capacity C is linearly dependent on the bandwidth B of the connection, and as the bandwidth increases the bit rate which can be transmitted also increases. However, a large number of transmission errors occur for large bandwidths B and at constant signal power S. For large bandwidths B, a finite value for the channel capacity C is calculated:

$$C=0.72S/N_0 \quad [Bit/s]$$

Taking this theoretical channel capacity as a basis, the test signal is transmitted. The bit error rate measuring device detects the current bit error rate and compares it with the previously set bit error rate threshold value. If the current bit error rate is above the bit error rate threshold value, then the physical bit rate is reduced and the test signal is transmitted at this available bit rate. These steps are repeated until the current bit error rate is below the bit error rate threshold value.

This negotiated physical bit rate is then used for comparison with the current bit rate on the connection in accordance with the aforementioned inventive method.

Preferably, the trigger signal is transmitted after the line card has been installed. This establishes whether an altered overall condition caused by installation of the line card results in a change in the current bit rate. The trigger signal can be transmitted additionally or alternatively at regular intervals of time. This performs continuous monitoring of the current bit rate over time, in particular.

In one preferred embodiment, the trigger signal is transmitted after the bit error rate threshold value has been exceeded. With this method, the bit error rate for the connection is measured continuously, and the trigger signal is transmitted if the previously detected bit error rate threshold value is exceeded. This method can be used when transmitting previously channel-coded data using error-recognizing or error-correcting channel codings. It is known that channel decoding of the data can then be used to infer the number of bit errors, and the bit error rate can thus be detected.

It is preferable for the trigger signal to be transmitted after the at least one corrective measure has been triggered. As a result, the effect of the measure, namely the desired increase in the current bit rate, is checked again. Should the corrective measure have shown no or insufficient effects, other and/or further corrective measures would need to be initiated.

In one preferred embodiment, the corrective measure comprises changing a cable allocation and/or changing at least one transmission module and/or changing the billing for the data service. These various corrective measures initiate evaluation of the bit error rate.

These corrective measures are, in one embodiment, taken in the transmission assembly. The cable allocation is preferably changed in a switching matrix. This corrective measure is the simplest and at the same time least expensive method of countering a drop in the bit rate. It simply involves redundant connections between the transmission assembly and the subscriber line being used for transmission. The lines used can be lines which are already used for data transmission for other subscriber lines but which still have free transmission capacities; alternatively, they can be backup lines used in reserve.

The drop in the bit rate on the bidirectional connection can also be caused by a defective transmission module for the transmission link. The transmission module can therefore be replaced after a drop in the current bit rate has been discovered. This corrective measure is appropriate particularly when a previously made change in the cable allocation has not resulted in a significant increase in the bit rate.

Changing the billing for the data service is appropriate particularly when corrective measures taken previously to increase the bit rate have been unsuccessful. If it is not possible to adhere to the bit rate of which a subscriber has been assured by an agreement, this corrective measure should be implemented.

In one preferred embodiment, the physical bit rates for a respective transmission direction and for a respective subscriber line are transmitted from the external control system to the transmission assembly and are stored in the bit rate threshold-value memory on the line card. The physical bit rates for the respective line card are thus continually updated and can be compared with the currently detected bit rates at any time by the comparator devices in the transmission assembly.

The messages are preferably transmitted to the external control system via an SNMP interface. For compatibility reasons, it has been found to be extremely advantageous if the physical bit rates are likewise transmitted to the transmission assembly via the SNMP interface. It is also possible to transmit the messages and/or the physical bit rates using other suitable interfaces, however.

It is also advantageous if the messages are transmitted using a leaky-bucket method for their priority. Leaky bucket is to be understood to be an analogous description of the algorithm which is used for checking concurrence in a flow of messages in networks. It is a flow control method in which an incoming data stream is compared with traffic parameters which are set by a source. This involves the method loading the messages into a buffer memory without the memory overflowing. The buffer memory allows individual messages to reach their destination (leaky). If the buffer memory threatens to overflow, nonconcurrent cells remain unconsidered. This allows the number of messages to be reduced further, and the addition of the actual bit rates then allows a specific, possibly even directional fault elimination procedure to be initiated.

In one preferred embodiment, the alarm message is stored in an alarm message memory in the external control system.

Preferably, the test signal is coded using error-recognizing or error-correcting channel coding before transmission, and the bit error rate is ascertained by the bit error rate measuring device on the basis of the recognized or corrected bit errors.

One arrangement for carrying out the proposed method having the aspects cited above comprises hardware components for producing these aspects.

BRIEF DESCRIPTION OF THE DRAWINGS

Reference is made to the description of an exemplary embodiment further below. In the figures.

DETAILED DESCRIPTION OF THE INVENTION

Figure 1:
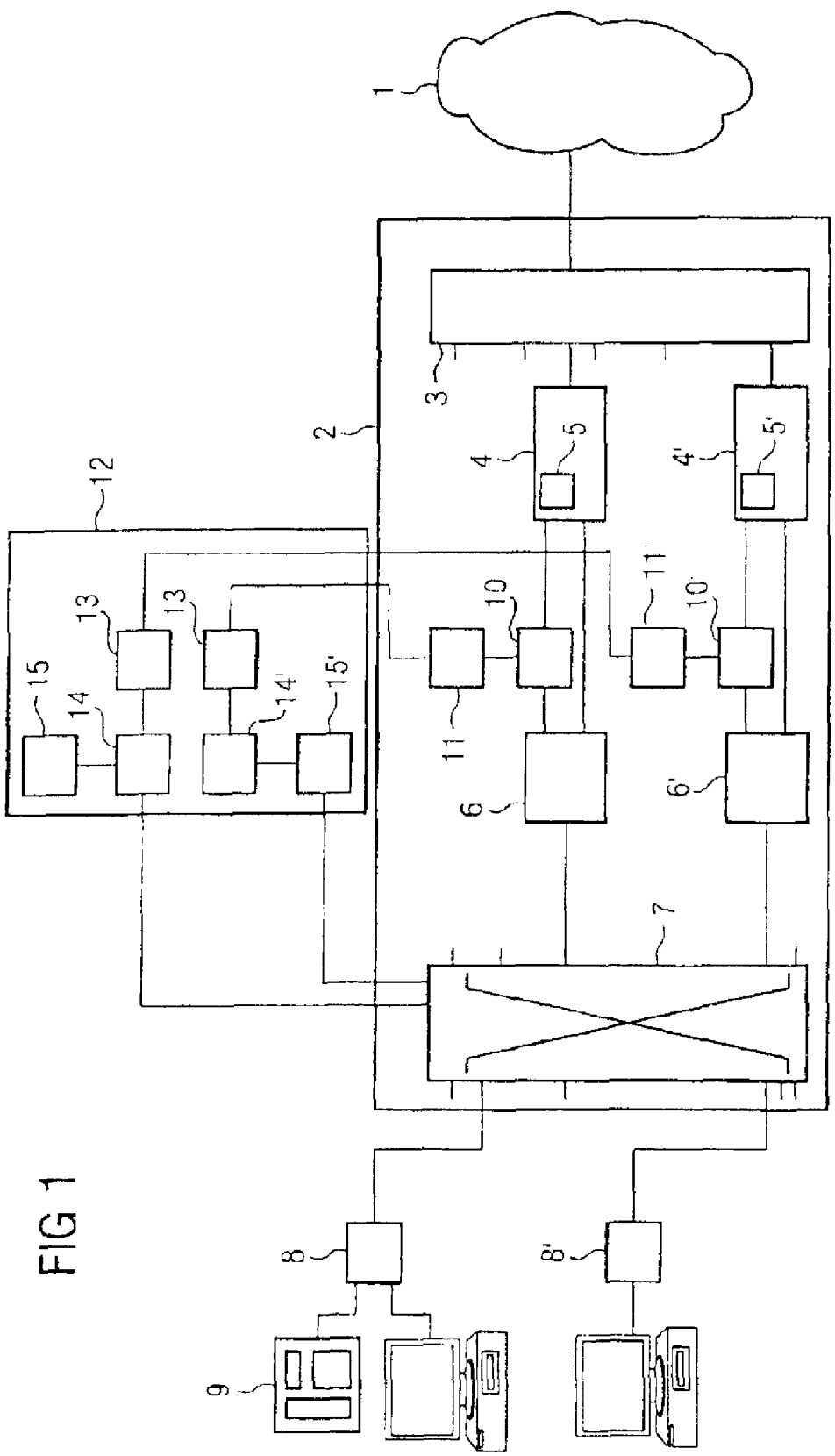
FIG. 1 shows an embodiment of the invention.

FIG. 1 shows a schematic illustration relating to the broadband connection of a plurality of subscribers to a public data network 1, particularly to the Internet. A transmission assembly 2 is connected to the data network 1 by means of a gateway 3. The gateway 3 is connected to a plurality of line cards 4, 4'. The line cards 4, 4' each include a bit rate threshold-value memory 5, 5' for storing subscriber-related physical bit rates, e.g., maximum bit rates which can be attained. The line cards 4, 4' are each connected to bit rate measuring devices 6, 6' via lines. The bit rate measuring devices are connected via lines to the input side of a switching matrix 7. The switching matrix is used for switching and connecting the connecting lines. It is used to connect input signals to corresponding outputs in fully transparent fashion. The switching matrix 7 comprises a plurality of interconnected matrices (switching matrices) of incoming and outgoing connecting lines which can be connected to one another by electronic contacts.

The output side of the switching matrix 7 is connected to network terminating units 8, 8' belonging to at least one subscriber. The network terminating units are connected to terminals 9 via lines.

The bit rate measuring devices 6, 6' are respectively connected to a comparator device 10, 10' which compares the current bit rates with physical bit rates, that is to say with respective subscriber-related bit rate threshold values. The respective physical bit rates are stored in the bit rate threshold-value memories 5, 5', to which the comparator device 10, 10' is likewise connected via lines.

Should a detected current bit rate distinguish a physical bit rate, an alarm device 11, 11' connected to the comparator device 10, 10' sends an alarm message to an alarm message memory 13, 13' arranged within an external control system 12. The alarm messages are then loaded from the alarm message memory by a correction device 14, 14'. The correction device 14, 14' is respectively connected to a correction memory 15, 15' which stores measures for increasing the current bit rate.

In the embodiment shown in FIG. 1, the measure taken to increase the current bit rate is a change in the circuit occupancy. The necessary changes are loaded from the correction memory 15, 15' by the correction device 14, 14' and are transmitted to the switching matrix 7. The switching matrix 7 then changes the circuit occupancy by transmitting the data via another line or via the original line and additionally using multiplexing via a further line which has free capacity.

Alternatively, the corrective measure taken can be a change of a transmission module. In another embodiment, it is also possible to change the billing for the data service.

Figure 2:
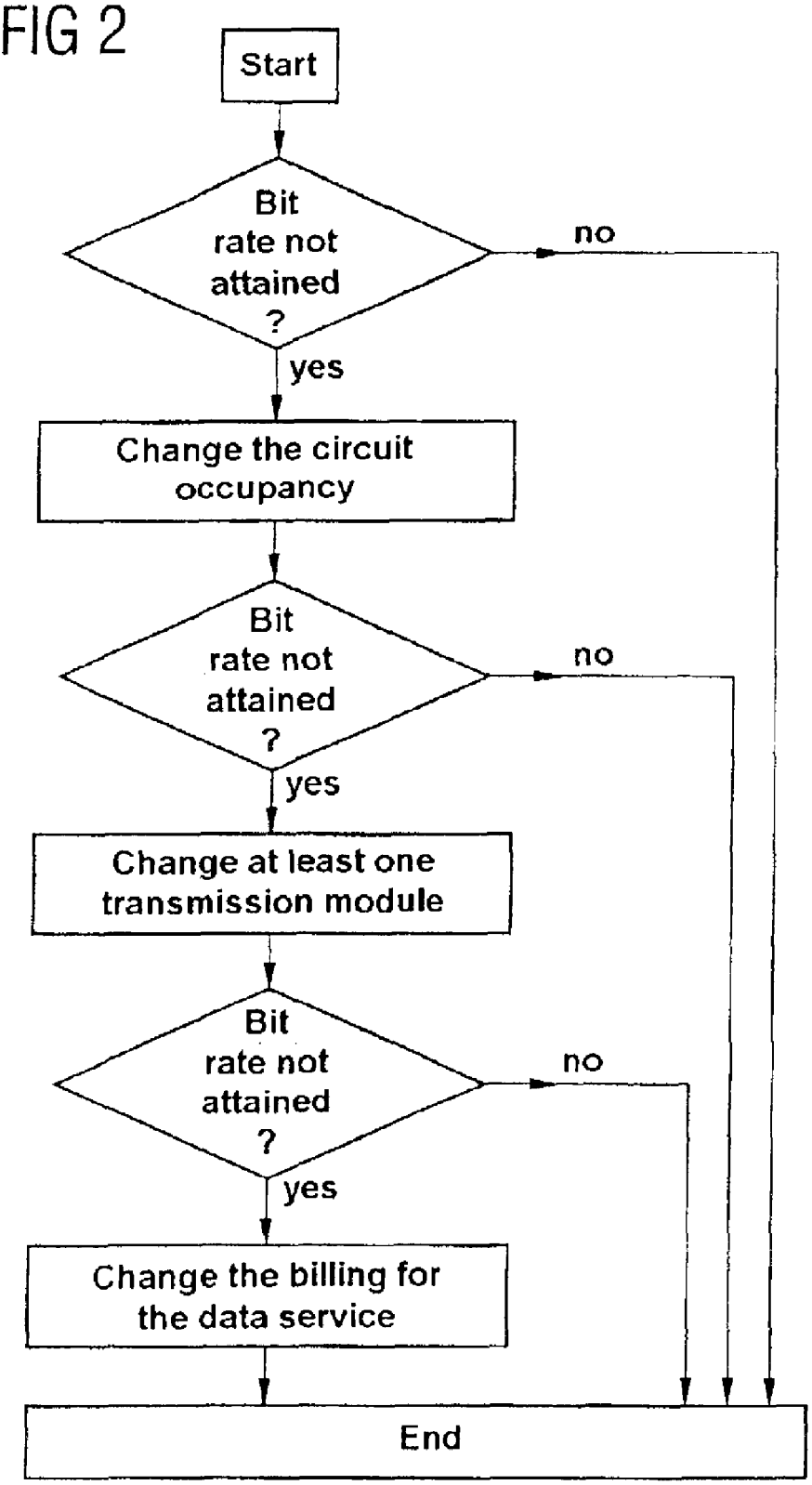
FIG. 2 shows a flowchart to explain the corrective measures.

FIG. 2 shows a flowchart to explain the corrective measures needing to be taken if there is a drop below the bit rate. If there is a drop below the bit rate, the circuit occupancy is changed. To this end, the data are transmitted via another line connection, for example. Following this corrective measure, the current bit rate is detected, and if the bit rate is still not attained, at least one transmission module is changed. The current bit rate is detected again, and if the bit rate has still not been attained, the billing for the data service is changed.

Figure 3:
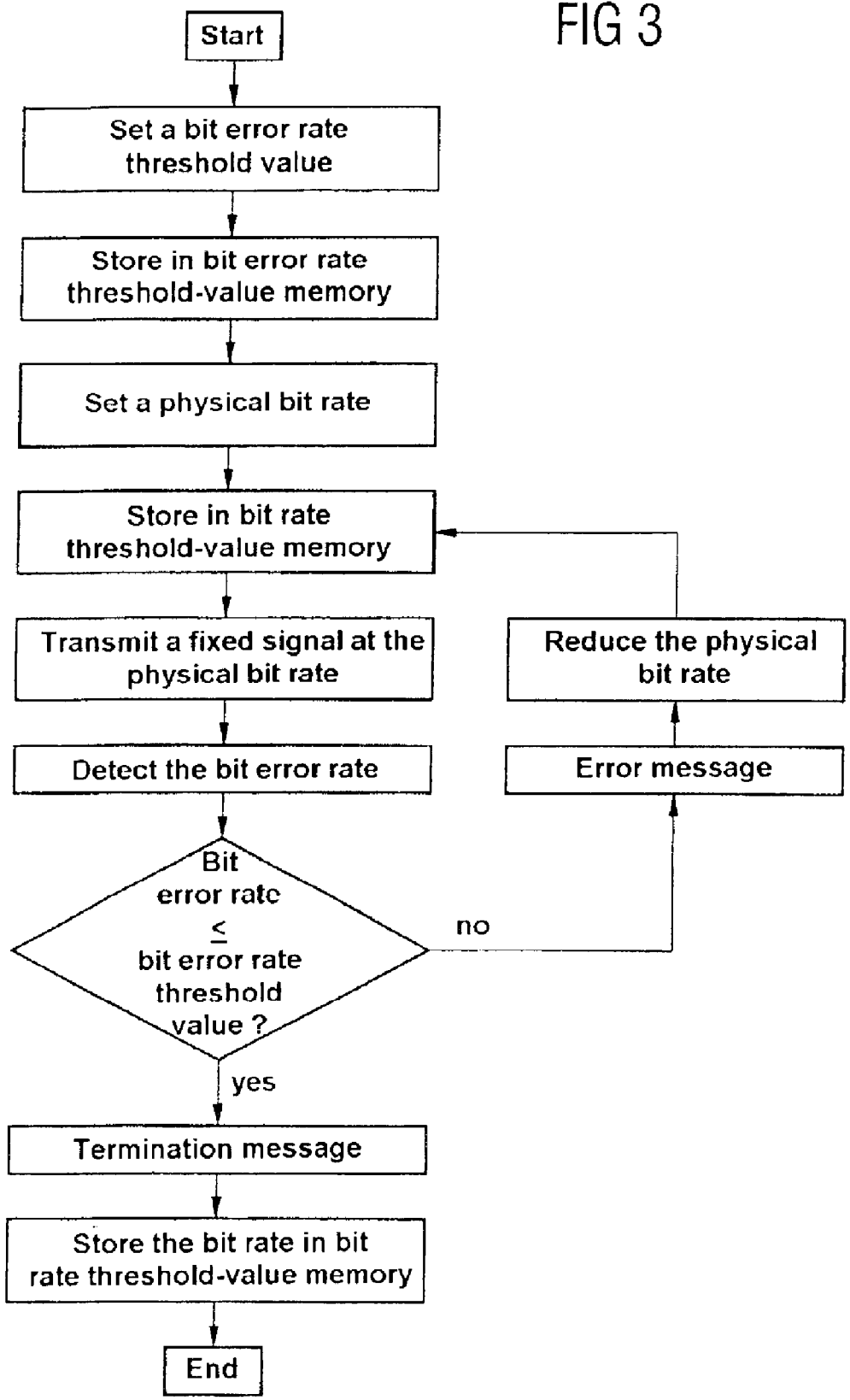
FIG. 3 shows a flowchart to explain detection of the physical bit rate.

FIG. 3 shows a flowchart to explain detection of the physical bit rate. On the basis of this flowchart, it becomes clear how detection of the bit error rate and comparison with a bit error rate threshold value are used to negotiate (work out) the current bit rate. The physical bit rate is detected on the basis of evaluation of the bit error rate for various system configurations created by corrective measures shown in FIG. 2. The flowchart is self-explanatory, which means that it is not discussed in more detail at this point.

The implementation of the invention is not limited to the examples described above, but is likewise possible with a large number of modifications which are within the scope of expert action.

What is claimed is:

1. A method for testing and maintaining a predetermined physical bit rate on a bidirectional connection between a transmission assembly and at least one terminal, comprising:

setting a physical bit rate and storing the physical bit rate in a bit rate threshold-value memory;

setting at least one corrective measure to increase the bit rate;

detecting the current bit rate between a line card in the transmission assembly and the terminal in response to a trigger signal;

comparing the detected current bit rate with the physical bit rate stored in the bit rate threshold-value memory on the line card by a comparator device;

generating an alarm message by an alarm device if the detected bit rate is below the physical bit rate;

transmitting the alarm message to an external control system; and triggering the at least one preset corrective measure by a correction device in response to the alarm message from the external control system.

2. The method as claimed in claim 1, wherein the trigger signal is output after the line card has been installed and/or at regular intervals of time and/or after the bit error rate threshold value has been exceeded.

3. The method as claimed in claim 1, wherein the trigger signal is transmitted after the at least one corrective measure has been triggered.

4. The method as claimed in claim 1, wherein the corrective measure comprises changing a cable allocation and/or changing at least one transmission module and/or changing the billing for the bidirectional connection.

5. The method as claimed in claim 1, wherein the physical bit rates for a respective transmission direction and for a respective subscriber line are transmitted from the external control system to the line card and are stored in the bit rate threshold-value memory.

6. The method as claimed in claim 1, wherein the alarm message is transmitted to the external control system via an SNMP, HML or Corba interface.

7. The method as claimed in claim 1, wherein the alarm message is generated using a leaky-bucket method.

8. The method as claimed in claim 1, wherein the alarm message is stored in an alarm-message memory in the external control system.

9. A method for stipulating a bit rate for a bidirectional connection between a transmission assembly and at least one terminal, comprising:

detecting a maximum physical bit rate which can be attained by evaluating a bit error rate for various system configurations which arise with at least one corrective measure in contrast to an initial configuration; and setting the maximum bit error rate for operation of the connection.

10. The method as claimed in claim 9, wherein detection of the physical bit rate on the bidirectional connection between the transmission assembly and the terminal, comprises:

setting a bit error rate threshold value and storing the value in a bit error rate threshold-value memory;

setting a physical bit rate on the bidirectional connection and storing the bit rate as a current physical bit rate in the bit rate threshold-value memory on the line card;

transmitting a test signal between the transmission assembly and the terminal at the current physical bit rate;

detecting the bit error rate of the transmitted test signal is detected using a bit error rate measuring device;

comparing the detected bit error rate with the bit error rate threshold value by a comparator device which is connected to a bit error rate measuring device and to the bit error rate threshold-value memory;

generating a termination message if the detected bit error rate is below the bit error rate threshold value;

continuing with storing, or an error message is generated, if the bit error rate threshold value is exceeded; and reducing the current bit rate and storing the current bit rate as a physical bit rate in the bit error rate threshold-value memory in response to the error message, and proceeding to the transmitting, the current physical bit rate is stored in the bit rate threshold-value memory in response to the termination message.

11. The method as claimed in claim 9, wherein the test signal is coded using error-recognizing or error-correcting channel coding of an encoder arranged on the line card before transmission and is transmitted, and the bit error rate is ascertained by the bit error rate measuring device on the basis of the recognized or corrected bit errors.

12. A transmission assembly for testing and maintaining a predetermined physical bit rate on a line connection, comprising:

a bit rate measuring device associated with a line connection to detect a current bit rate on the line connection;

a comparator device connected to the bit rate measuring device and to the bit rate threshold-value memory to compare the detected current bit rate with a stored physical bit rate; and an alarm device, connected to the comparator device, to generate an alarm message if the detected bit rate is below the physical bit rate and to transmit the alarm message to an external correction device.

13. An arrangement for testing and maintaining a predetermined physical bit rate on a line connection, having a transmission assembly, comprising:

a bit rate measuring device associated with a line connection to detect a current bit rate on the line connection;

a comparator device connected to the bit rate measuring device and to the bit rate threshold-value memory to compare the detected current bit rate with a stored physical bit rate;

an alarm device, connected to the comparator device, to generate an alarm message if the detected bit rate is below the physical bit rate and to transmit the alarm message to an external correction device;

an external control system connected to the transmission assembly;

an alarm message memory, arranged in the external control system, to store the alarm message sent by the alarm device in the transmission assembly;

a correction device, connected to the alarm message memory, to trigger a corrective measure; and a correction memory, connected to the correction device, to store the at least one corrective measure.

* * * * *